United States Patent [19]

Kawamura et al.

[11] Patent Number: 4,591,954
[45] Date of Patent: May 27, 1986

[54] LAMP DEVICE FOR A VEHICLE MOUNTED ON A REAR WINDOW OR THE LIKE

[75] Inventors: Toshihide Kawamura, Yono; Hoichiro Kashiwabara, Hino; Osamu Waki, Mitaka; Hiro Sakai, Atsugi, all of Japan

[73] Assignee: Stanley Electric Co., Ltd., Tokyo, Japan

[21] Appl. No.: 718,805

[22] Filed: Apr. 2, 1985

[30] Foreign Application Priority Data

Apr. 6, 1984 [JP] Japan .............. 59-50578[U]

[51] Int. Cl.⁴ ............................................. B60Q 1/00
[52] U.S. Cl. .................... 362/61; 362/236; 362/244; 362/455; 340/84; 340/815.03
[58] Field of Search ................. 362/61, 227, 236, 257, 362/800, 80, 81, 235, 244, 249, 308, 326, 339, 367, 455, 332; 340/84, 85, 87, 67, 97, 815.2, 815.15, 815.03, 815.17

[56] References Cited

U.S. PATENT DOCUMENTS

| | | | |
|---|---|---|---|
| D. 216,222 | 12/1969 | Magi et al. ............................ | 411/321 |
| D. 274,269 | 6/1984 | Shanklin ............................... | 350/639 |
| 1,216,207 | 2/1917 | Burgess ................................ | 340/145 |
| 1,357,034 | 10/1920 | D'Humy ............................... | 362/240 |
| 2,760,113 | 8/1956 | Danek .................................. | 340/71 |
| 2,939,108 | 5/1960 | McIntire .............................. | 340/127 |
| 3,105,884 | 10/1963 | Cottrell ............................... | 200/61.89 |
| 3,226,707 | 12/1965 | Newman et al. ..................... | 340/810 |
| 3,469,235 | 9/1969 | Devlin et al. ........................ | 340/107 |
| 3,514,752 | 5/1970 | Lurkis ................................. | 340/84 |
| 3,631,251 | 12/1971 | Lebovec .............................. | 340/815.2 |
| 3,665,392 | 5/1972 | Annas .................................. | 340/67 |
| 4,153,928 | 5/1979 | Speedy ................................ | 362/367 |
| 4,235,523 | 11/1980 | Lapeyre ............................... | 340/84 |
| 4,373,153 | 2/1983 | Sano et al. .......................... | 340/87 |
| 4,459,644 | 7/1984 | Bailly .................................. | 362/240 |
| 4,464,649 | 8/1984 | Her ...................................... | 340/72 |
| 4,488,141 | 12/1984 | Ohlenforst et al. ................. | 340/97 |

FOREIGN PATENT DOCUMENTS

| | | | |
|---|---|---|---|
| 1076513 | 2/1960 | Fed. Rep. of Germany ...... | 362/240 |
| 2253359 | 7/1974 | Fed. Rep. of Germany . | |
| 331738 | 5/1971 | Japan . | |
| 4467790 | 1/1975 | Japan . | |
| 320148 | 10/1929 | United Kingdom . | |
| 2139340 | 11/1984 | United Kingdom ............... | 362/800 |

Primary Examiner—Craig R. Feinberg
Assistant Examiner—David A. Okonsky
Attorney, Agent, or Firm—Frishauf, Holtz, Goodman & Woodward

[57] ABSTRACT

A lamp device for projecting a brake light signal on a motor vehicle comprising a lamp base in the form of a staircase having vertical and horizontal faces, a plurality of light sources mounted on at least one of the vertical faces of the lamp base and a light-transmissive casing having a staircase shape generally complimentary to the shape of the lamp base and overlaying the lamp base. The lamp device further comprises means for attaching same to the rear window of a motor vehicle.

23 Claims, 5 Drawing Figures

LAMP DEVICE FOR A VEHICLE MOUNTED ON A REAR WINDOW OR THE LIKE

BACKGROUND OF THE INVENTION

The present invention is directed to lamp devices such as those used in connection with brake and signal systems on motor vehicles such as automobiles, trucks, etc. Recently, government authorities involved in the use of safety devices on motor vehicles have proposed the use of more visible brake lights than those customarily used in the tail section of automobiles and trucks.

Conventional stop lamps mounted at the rear tail section of a vehicle are low in position and hard to see. The plane of vision of drivers of automobiles is more in line with the rear window of the automobile which they are travelling behind that the lower positioned tail section. This is especially true of drivers of trucks who sit in an elevated cab section. In situations where a driver must react quickly to a sudden stop or change of direction of the vehicle in front of him, it takes a moment for the driver to adjust his plane of vision downward to visually pick up the illumination of the vehicle's brake lights and/or directional signals. In emergency situations, the time lost for a driver to adjust his line of sight can be critical, as evidenced by the large number of rear end collisions on highways and local streets.

In view of the above, an additional stop lamp is sometimes mounted at a lower end of the rear window of the vehicle, separately from the conventional vehicle stop lamps and above the conventional vehicle stop lamps. It is preferable that the stop lamp of this kind is made as small as possible so as not to obscure the rear view of a driver, but which has a high performance. It is further desirable that upwardly directed light should be avoided as much as possible so as not to interfere with the vision of other drivers or to dazzle the driver following the vehicle.

The object of the present invention therefore, is to provide a brake light/signal light system in which the time lost in reacting to the illumination of the signal is minimized.

It is a further object of the invention to provide a lamp device which is easily mounted on a motor vehicle and which provides a highly visible light signal in the normal plane of vision of the trailing driver, but which is small enough so as not to obscure the rear vision of the driver of the vehicle.

SUMMARY OF THE INVENTION

According to the present invention a lamp device for projecting a light signal on a motor vehicle comprises a lamp base in the form of a staircase having at least one pair of alternating substantially horizontal and substantially vertical faces; a plurality of spaced apart light sources mounted on at least one of said substantially vertical faces for projecting a light signal outwardly from said substantially vertical faces; and a light-transmissive casing having a staircase shape generally complimentary to the staircase shape of the lamp base and mounted over the lamp base such that the substantially vertical faces of the casing are adjacent the vertical faces of the lamp base and the light sources mounted on the substantially vertical faces of the lamp base.

In a preferred arrangement, the vertical surfaces of the casing have concave shapes (lens cuts) opposite the respective light sources to improve light transmission. In a preferred arrangement, the light sources comprise LED lamps having light emitting characteristics which provide a high degree of forward directivity, In a further preferred arrangement, the LED lamps have convex shapes adjacent the concave shape lens cuts of the substantially vertical surfaces of the casing.

DETAILED DESCRIPTION

It is preferred that a rear window mounted stop lamp be as small as possible so as not to interfere with the rear view of the driver of the vehicle. It is also desirable that the light beam projected by the rear window mounted stop lamp device exhibit high performance and that the light beam should be substantially free of upwardly directed light so as not to distort the light signal and thereby dazzle or interfere with the vision of the trailing driver.

Figure 1:
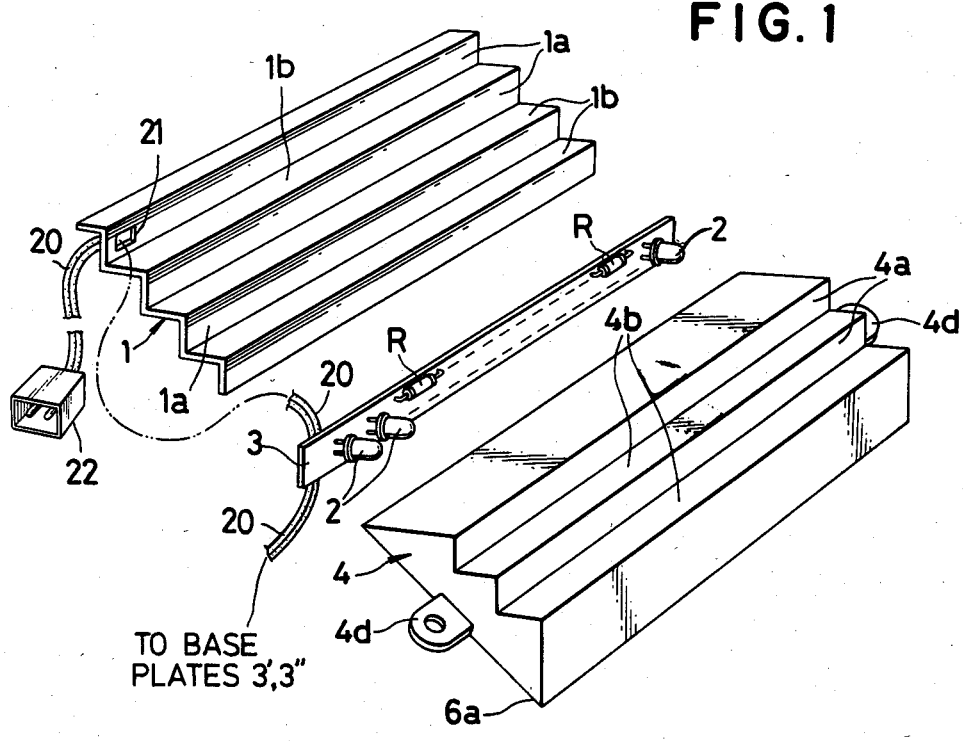
FIG. 1 is an exploded perspective view of the lamp device of the present invention, adapted for mounting on the exterior surface of a rear window of a vehicle.

In a preferred form of the present invention, LED lamps having forward directivity are used as a light source. Referring to FIG. 1, the lamp device of the invention comprises a lamp base 1 which is formed like a staircase and having at least one pair of alternating vertical surfaces 1a and horizontal surfaces 1b. A plurality of LED lamps 2 (see FIG. 2) having forward directivity are mounted on the front sides of each of the vertical surfaces 1a. A light transmissive lens casing 4 is mounted on the lamp base 1 and has a staircase shape complementary to the shape of the lamp base 1. The lens casing 4 has vertical surfaces 4a in alignment with the vertical surfaces 1a of the lamp base 1, the inner surface of the vertical surfaces having concave portions 4c generally opposite the convex shapes of the respective LED lamps 2. The concave portions 4c are in registration with respective LED lamps 2 and serve as "lens cuts" to improve light transmission.

Figure 3:
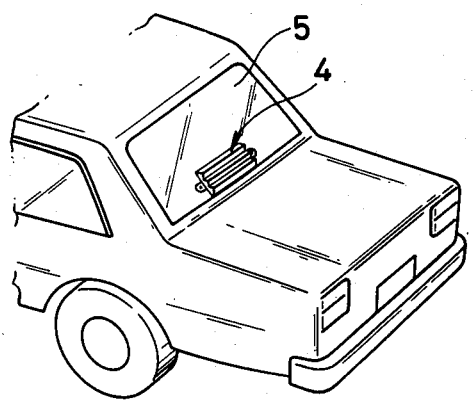
FIG. 3 is a perspective view showing the lamp device of FIG. 1 mounted on the exterior surface of a rear window of an automobile.

Lamp base 1 is formed of a metal, plastic or other suitable material. The plurality of LED lamps 2 are mounted on each of the vertical surfaces 1a on the front side of the lamp base 1 through base plates 3, 3', 3'', preferably using printed circuit techniques. The base plates are fastened to vertical surfaces 1a via adhesive, screws, rivets, or the like. LED lamps 2 generate a light beam having a strong forward directivity in the direction parallel to the optical axis thereof. In FIGS. 1 and 3 the light is radiated substantially perpendicularly to the vertical faces 1a of the lamp base 1.

Lens casing 4, which is typically formed of a light-transmissive material, preferably a synthetic resin, has a staircase shape complementary to the shape complementary to the shape of lamp base 1 such that lens casing 4 overlaps lamp base 1 and forms an integral unit therewith. Vertical surfaces 4a of lens casing 4 have interior concave surfaces 4c which are light-distributing lens cuts having a shape generally complementary to and spaced apart from LED lamps 2. Mounting tabs 4d are provided on the sides of lens casing 4 for mounting the integral unit to the rear window of an automobile.

Figure 2:
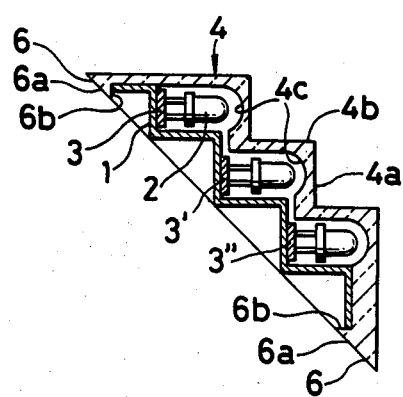
FIG. 2 is a sectional view of the assembled lamp device shown in FIG. 1.
Figure 5:
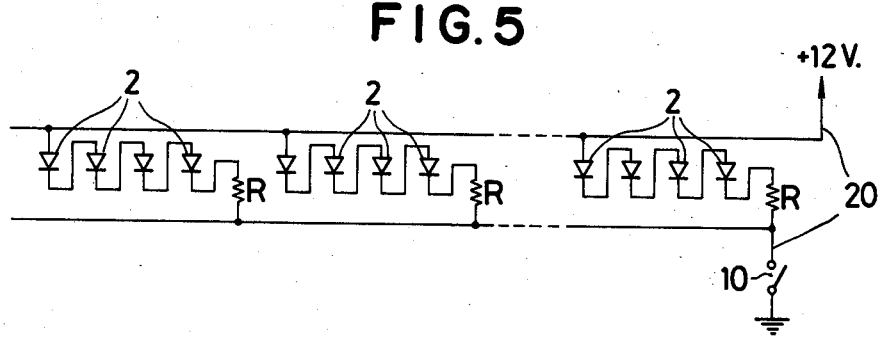
FIG. 5 is a diagram of the electrical circuitry employed for operating the lamp device in accordance with the present invention.

LED lamps 2 are arranged on base plates 3, 3', 3" so that they face respective interior concave surfaces 4c of lens casing 4 as shown in FIG. 2. The light generated by LED lamps 2 is directed substantially perpendicularly to vertical surfaces 1a of lamp base 1 and substantially parallel to the horizontal surfaces 1b of both the lamp base 1 and lens casing 4. The LED lamps and resistors R of each base plate 3, 3', 3" are electrically connected as shown in FIG. 5. More or fewer LED lamps can be provided on each base plate 3, 3', 3". The base plates 3, 3', 3" are connected in parallel with each other by wires 20 which connect the LED arrays to a power source (i.e. 12 V in an automobile) and to a brake light switch 10, as schematically shown in FIG. 5. Lead wire 20 passes through a hole 21 in lamp base 1 and has an electrical connector 22 at an end thereof for connection to the powe souce and bake light.

When the lamp device of the present invention is to be mounted on the exterior surface of a rear window 5 of an automobile, as shown in FIG. 3, lens casing 4 has end portions 6 which overlap the end portions of lamp base 1 such that the end portions 6 of lens casing 4 lie substantially flush against the rear window of the automobile. More specifically, the interior walls 6b of lamp base 1 contact the end portion of lamp base 1 and wall 6a of lens casing 4 comes in contact with the rear window to provide stability of the integral unit against the rear window. The lamp base 1 preferably "snaps" into the casing 4 with the ends thereof in retaining abutment with surfaces 6b of casing 4.

Mounting tabs 4d are situated on both sides of lens casing 4 and have a through hole in which a fastener may be inserted. The fastener is placed in a hole in the rear window which is in registration with the through hole in mounting tab 4d. Alternatively, the integral unit may be attached to the rear window by applying an adhesive on those surfaces of the lens casing (e.g., wall surface 6a) which are in contact with the rear window to provide adhesion between the integral unit and the rear window. Undersurfaces 6a preferably contact the vehicle window to keep out contamination. Undersurfaces 6a may have a foam or other resilient material thereon to better conform to the window shape.

Figure 4:
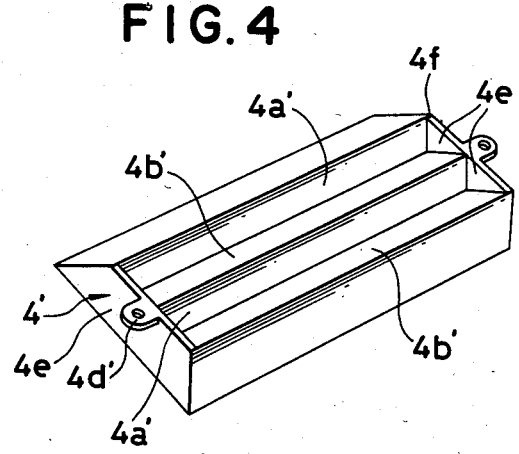
FIG. 4 is a perspective view of another embodiment of the present invention for mounting on the interior surface of a rear window of a vehicle.

FIG. 4 shows another embodiment of the present invention in which the lamp device is mounted on the inside of the rear window. In this embodiment, the integral unit is attached to the interior surface of the rear window of the motor vehicle. The lens casing 4' has a pair of opposed side walls 4e which lie above the plane of the horizontal faces and vertical faces of lamp base 1. LED lamps 2 are fixed to vertical faces 1a of the lamp base through base plates 3 in the same manner as in FIGS. 1 and 2. The lamp base 1 is substantially the same as that used in the embodiment of FIGS. 1 and 2. The unit is secured to the interior surface of the rear window by means of tabs 4d' in the same manner as the tabs 4d of the first-described embodiment.

It is preferred that the rear end surface 6a of the embodiment of FIGS. 1-3 or front end surfaces 4f of the embodiment of FIG. 4 have a shape complementary to the shape of the rear window. For example, typical rear windows of modern day automobiles have a curved shape and the shape of rear end surfaces 6a or front end surfaces 4f preferably have a complementary curved shape.

In some cases, the length of the integral unit in the horizontal direction is sufficiently long so that the side ends thereof reach a frame for holding the rear window glass. Such an embodiment is not shown, but can be envisaged by observing FIG. 3 and noting that the unit may be so wide as to span the complete width of the window 5. In such a case, the mounting tabs 4d (of FIG. 1) or mounting tabs 4d' (of FIG. 4) can be secured to the side edges of the window glass frame by means of screws, bolts, or the like. In this case, it is not necessary to drill holes in the window glass or to adhere the tabs to the window glass per se.

In operation, when LED lamps 2 are lit, for example, upon depression of a brake pedal, the light is incident upon the respective concave interior surfaces 4c (lens cuts) of the lens casing 4 due to the forward directivity of the light beam and is radiated rearwardly from vertical surfaces 4a of lens casing 4 (i.e., perpendicular to and away from vertical surface 4a). Thus, the light is substantially not radiated from the horizontal surfaces 4b of lens casing 4. This prevents projection of light in an upward direction which diffuses the forward directed light beam from vertical surface 4a and thus prevents dazzling the driver following the vehicle. For this reason, shielding means such as a coating of the horizontal surface 4b of lens casing 4 is not necessary nor is a shielding member to prevent the upward deflection of light necessary.

FIG. 5 shows a typical connection of groups of LED's in which the LED's 2 of each group are connected in series, and the groups are connected in parallel. Resistors R are used for controlling the flow of electric current through the LED's of each group. Each group of series connected LED's includes 4 or 5 LED's, and the overall lamp device of the present invention utilizes approximately 100 LED's in total. The parallel connection of the LED's is connected to the conventional brake lamp switch 10 as shown in FIG. 5. If an LED becomes defective (i.e., open circuited), only the particular group is affected—the remaining groups will operate normally, thus increasing reliability. More than one group of 4–5 LED's are mounted on each base plate 3, and a base plate 3 carrying LED's thereon is preferably mounted on each of the vertical surfaces 1a. The number of vertical surfaces 1a and associated base plates 3 thereon may be more or less than the three as shown in FIG. 1. Preferably, however, three or more such vertical surfaces 1a and associated LED base plates 3 are provided.

As described above, in accordance with the present invention, the lamp device of the present invention which is mounted on a rear window, comprises LED lamps 2 having a strong forward directivity as a light source. Thus, the present invention provides a lamp device which is small in size and has high performance. In addition, the lamp device of the present invention substantially prevents the emanation of upwardly directed light which can adversely affect the vision (i.e., dazzling) of the trailing driver.

As evident from the foregoing, the lamp device of the present invention can be mounted on a rear window as well as any other suitable place on an automobile or truck, preferably above the conventional tail and brake lights.

What is claimed is:

1. A lamp device for projecting a light signal on a motor vehicle comprising:
   a lamp base and a light-transmissive casing each in the shape of a stepped staircase having at least two adjacent steps, said adjacent steps being defined by at least one pair of alternating substantially horizontal and substantially vertical faces;
   a plurality of light sources mounted on at least one of said substantially vertical faces of said lamp base for projecting a light signal outwardly from said at least one vertical face; and
   said casing being mounted over said lamp base such that:
   the substantially horizontal faces of said at least two adjacent steps of said casing are substantially parallel to the substantially horizontal faces of said at least two adjacent steps of said lamp base; and
   the substantially vertical faces of said at least two adjacent steps of said casing are substantially parallel to the substantially vertical faces of said at least two adjacent steps of said lamp base and adjacent to said light sources which are mounted on said substantially vertical faces of said lamp-base;
   means for energizing said light sources for generating a light signal from said light source; and
   means for attaching said lamp device to said motor vehicle.

2. The lamp device of claim 1, wherein said attaching means comprises at least one pair of mounting members (4d) extending from said casing and adapted to be fastened to a rear window of said motor vehicle.

3. The lamp device of claim 1, wherein said attaching means comprises an adhesive between a surface of a rear window of said motor vehicle and a surface of said lamp base.

4. The lamp device of claim 1, wherein said light-transmissive casing further comprises end portions (6) overlaying corresponding end portions of said lamp base and having a first surface (6a) in contact with and substantially complimentary to exterior surface of a rear window and a second surface (6b) in contact with said lamp base.

5. The lamp device of claim 1, further comprising a base plate on which a plurality of said light sources are mounted, said base plate being attached to the vertical surface of said lamp base.

6. The lamp device of claim 1, wherein said light-transmissive casing is made of a synthetic resin.

7. The lamp device of claim 1, wherein said light-transmissive casing includes a pair of opposed side walls (4e) which extend above the plane of the horizontal and vertical faces of said lamp base, said opposed side walls being adapted to be mounted adjacent the interior surface of a vehicle rear window, wherein the light-sources on the vertical faces of the lamp base are recessed in said lamp device below said opposed side walls (4e).

8. The lamp device of claim 7, wherein said attaching means comprises at least one pair of mounting members affixed to an upper portion of said pair of opposed side walls of said casing and adapted to be fastened to said rear window.

9. The lamp device of claim 7, wherein said attaching means comprises an adhesive between an upper surface of said casing and the interior surface of said rear window.

10. The lamp device of claim 7, further comprising a base plate on which a plurality of said light sources are mounted, said base plate being attached to the vertical surface of said lamp base.

11. The lamp device of claim 7, wherein the top surface of said casing has a shape generally complimentary to the shape of the interior surface of the rear window.

12. The lamp device of claim 1, wherein said light sources comprise a plurality of spaced apart light emitting diodes.

13. The lamp device of claim 12, wherein said light-transmissive casing further comprises concave inner surface portions formed on the inner surfaces of said vertical faces and facing said light emitting diodes.

14. The lamp device of claim 12, wherein said light emitting diodes each have a convex surface, the angle of curvature of the concave inner surfaces of said light-transmissive surface being substantially complimentary to the convex surfaces of said light emitting diodes.

15. The lamp device of claim 12, wherein a plurality of said light emitting diodes are series connected in group, and wherein a plurality of said groups are connected in parallel.

16. The lamp device of claim 15, wherein a plurality of said light emitting diodes are series connected in group, and wherein a plurality of said groups are connected in parallel.

17. The lamp device of claim 12, wherein said casing comprises a plurality of lens cuts on the inner surface of said vertical faces and opposite said light emitting diodes.

18. The lamp device of claim 17, wherein said light-transmissive casing is made of a synthetic resin.

19. The lamp device of claim 12, wherein each of said light emitting diodes emit light in a direction substantially perpendicular to the vertical face of said lamp base on which it is mounted and through the corresponding vertical face of said light-transmissive casing.

20. The lamp device of claim 19, wherein said attaching means comprises an adhesive between a surface of a rear window of said motor vehicle and a surface of said lamp base.

21. The lamp device of claim 19, wherein said attaching means comprises at least one pair of mounting members (4d) extending from said casing and adapted to be fastened to a rear window of said motor vehicle.

22. The lamp device of claim 21, wherein said light-transmissive casing further comprises end portions (6) overlaying corresponding end portions of said lamp base and having a first surface (6a) in contact with and substantially complimentary to an exterior surface of a rear window and a second surface (6b) in contact with said lamp base.

23. The lamp device of claim 21, wherein the bottom surface of said casing has a shape generally complimentary to the shape of the exterior surface of the rear window.

* * * * *